United States Patent
Koishi et al.

(10) Patent No.: US 10,510,258 B2
(45) Date of Patent: Dec. 17, 2019

(54) VEHICLE CONTROL METHOD AND VEHICLE CONTROL APPARATUS

(71) Applicant: Nissan Motor Co., Ltd., Yokohama-shi, Kanagawa (JP)

(72) Inventors: Akifumi Koishi, Kanagawa (JP); Tomoyuki Koike, Kanagawa (JP); Atsushi Tezuka, Kanagawa (JP)

(73) Assignee: Nissan Motor Co., Ltd., Yokohama (JP)

(*) Notice: Subject to any disclaimer, the term of this patent is extended or adjusted under 35 U.S.C. 154(b) by 0 days.

(21) Appl. No.: 16/329,868

(22) PCT Filed: Sep. 15, 2016

(86) PCT No.: PCT/JP2016/077285
§ 371 (c)(1),
(2) Date: Mar. 1, 2019

(87) PCT Pub. No.: WO2018/051466
PCT Pub. Date: Mar. 22, 2018

(65) Prior Publication Data
US 2019/0213888 A1   Jul. 11, 2019

(51) Int. Cl.
*B60R 16/03* (2006.01)
*B60R 16/033* (2006.01)
*G08G 1/16* (2006.01)

(52) U.S. Cl.
CPC ............ *G08G 1/166* (2013.01); *B60R 16/03* (2013.01); *B60R 16/033* (2013.01); *G08G 1/16* (2013.01); *B60L 2240/54* (2013.01); *G08G 1/167* (2013.01)

(58) Field of Classification Search
CPC ........................................................ B60R 16/03
(Continued)

(56) References Cited

U.S. PATENT DOCUMENTS

| 6,175,787 | B1 * | 1/2001 | Breed | B60N 2/0232 |
|---|---|---|---|---|
| | | | | 340/438 |
| 9,555,788 | B2 * | 1/2017 | Brok | B60T 13/146 |

(Continued)

FOREIGN PATENT DOCUMENTS

| DE | 10 2007 027 970 A1 | 12/2008 |
|---|---|---|
| JP | 7-17375 | 1/1995 |

(Continued)

*Primary Examiner* — Fritz M Fleming
(74) *Attorney, Agent, or Firm* — Global IP Counselors, LLP

(57) ABSTRACT

A vehicle control method is provided for the suppression of electric power supplied from a battery to other electrical equipment in the event an alternator fails during automatic driving by use of automatic driving electrical equipment. The vehicle control method includes detecting surrounding information of the vehicle in an event the alternator fails during automatic driving by use of the automatic driving electrical equipment, estimating electric power to be consumed by the automatic driving electrical equipment until the vehicle stops based on a plan for stopping the vehicle in a safe location in accordance with the surrounding information that was detected, and reducing the electric power supplied from the battery to the other electrical equipment apart from the automatic driving electrical equipment as the estimated amount of electric power increases.

4 Claims, 8 Drawing Sheets

(58) Field of Classification Search
USPC .......................................................... 701/29.2
See application file for complete search history.

(56) References Cited

U.S. PATENT DOCUMENTS

| | | | |
|---|---|---|---|
| 9,606,537 B2 * | 3/2017 | Hogenmueller | G05D 1/0077 |
| 9,718,363 B2 * | 8/2017 | Stemmer | B60L 3/0023 |
| 2014/0081509 A1 * | 3/2014 | Koch | G07C 5/0808 |
| | | | 701/29.2 |
| 2017/0267221 A1 * | 9/2017 | Hecker | B60T 7/085 |
| 2017/0320500 A1 * | 11/2017 | Yoo | B60W 30/0956 |
| 2019/0187272 A1 * | 6/2019 | Nemeth | G06K 9/00805 |
| 2019/0217857 A1 * | 7/2019 | Sorin | B60W 30/09 |

FOREIGN PATENT DOCUMENTS

| | | |
|---|---|---|
| JP | 2006-205867 A | 8/2006 |
| JP | 2007-55537 A | 3/2007 |
| JP | 2008-279898 A | 11/2008 |
| JP | 2009-220601 A | 10/2009 |
| JP | 2011-207384 A | 10/2011 |
| JP | 2016-39770 A | 3/2016 |
| JP | 2016-78665 | 5/2016 |
| JP | 2016-128283 A | 7/2016 |
| WO | 01/18932 A1 | 3/2001 |
| WO | 2016/045836 A1 | 3/2016 |

* cited by examiner

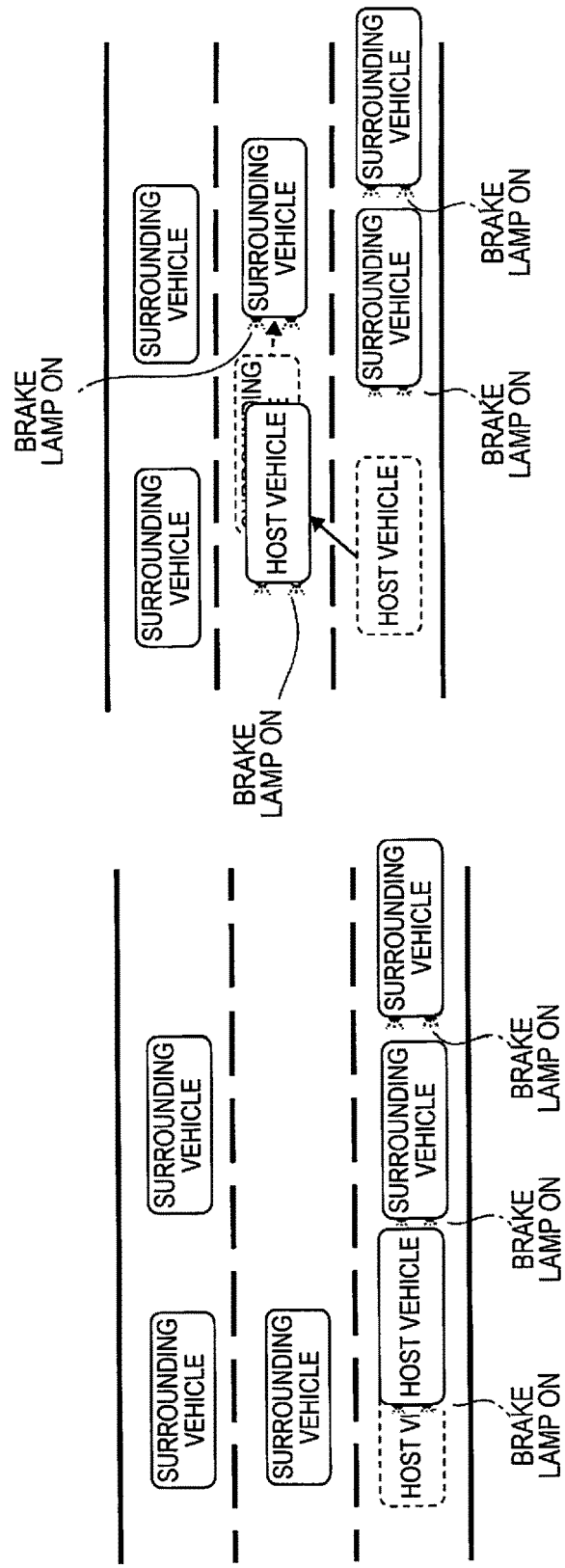

VEHICLE CONTROL METHOD AND
VEHICLE CONTROL APPARATUS

CROSS-REFERENCE TO RELATED
APPLICATIONS

This application is a U.S. national stage application of International Application No. PCT/JP2016/077285, filed on Sep. 15, 2016.

BACKGROUND

Technical Field

The present invention relates to a control method and a control device for a vehicle having an automatic driving device.

Background Information

Japanese Laid Open Patent Application No. 2016-39770 (Patent Document 1) discloses a vehicle having automatic driving electrical equipment in which electric power generated by means of an alternator is stored in a battery and the electric power is used to carry out automatic driving.

SUMMARY

However, if the alternator fails while the automatic driving electrical equipment is in operation, there is the risk that sufficient electric power cannot be supplied to the automatic driving electrical equipment. An object of the present invention is to provide a vehicle control method with which it is possible to ensure safety even in the event the alternator fails during automatic driving control.

In order to achieve the object described above, the vehicle control method according to the present invention comprises: suppression of the electric power supplied from a battery to other electrical equipment in the event an alternator fails during automatic driving by use of the automatic driving electrical equipment.

Therefore, it is possible to ensure the electric power to be used by the automatic driving electrical equipment.

BRIEF DESCRIPTION OF THE DRAWINGS

FIG. 12 is a schematic view showing the evacuation plan based on the travel situation around the host vehicle according to the second embodiment.

FIG. 13 is a schematic view showing the evacuation plan based on the travel situation around the host vehicle according to the second embodiment.

DETAILED DESCRIPTION OF THE
EMBODIMENTS

Embodiments of the present invention will be explained below with reference to the appended drawings.

First Embodiment

Figure 1:
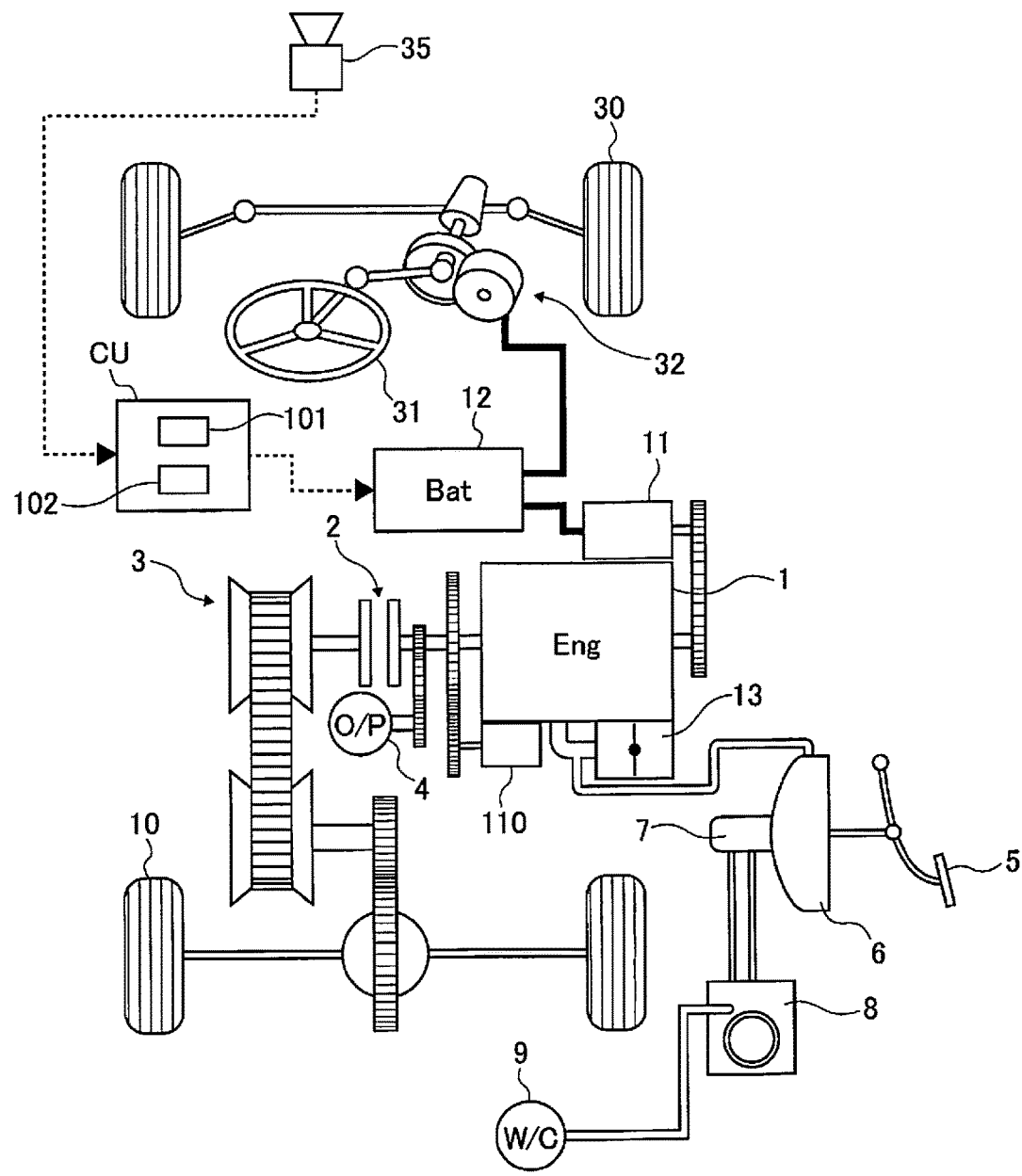
FIG. 1 is a system diagram of a vehicle in which is applied automatic driving control according to a first embodiment.

FIG. 1 is a system diagram of a vehicle in which is applied automatic driving control according to a first embodiment. Rotation output from an engine 1, which is an internal combustion engine, is input to a belt-type continuously variable transmission 3 via a clutch 2. The rotation, which has its speed changed by the belt-type continuously variable transmission 3, is transmitted to the drive wheels 10 via a final gear, and the like. The engine 1 includes an alternator 11 (hereinafter referred to as ALT) connected via a belt that is wound between the alternator and a crankshaft and functions as a generator, a starter motor 110 that carries out cranking by an engagement of gears, a battery unit 12 that supplies electric power to the starter motor 110 as well as sending and receiving electric power to and from the ALT, and a throttle valve 13 that controls an intake air amount of the engine 1. An oil pump 4 is provided on an output shaft of the engine 1, and the belt-type continuously variable transmission 3 is controlled by the hydraulic pressure of the oil pump 4. An electric oil pump, or the like, may be provided instead; no limitation is imposed.

A master back 6 that assists a brake pedal operating force by using a negative pressure of the engine 1 is connected to the brake pedal 5. The master back 6 is connected to the engine 1 farther on the cylinder chamber side than the throttle valve 13 by piping, and the negative pressure that is generated accompanying a piston motion of the engine 1 is supplied to the master back 6. A master cylinder 7 that supplies wheel cylinder pressure is connected to the master back 6. The master cylinder 7 is connected to a wheel cylinder 9 of each wheel via a brake control unit 8 (hereinafter referred to as VDC) that carries out anti-lock brake control, vehicle stability control, and the like. The brake control unit 8 includes a pump motor and various solenoid valves and is configured to be capable of supplying brake fluid pressure to the wheel cylinders 9 by driving the pump motor, regardless of the operation state of the brake pedal by the driver.

Steerable wheels 30 are connected to a steering wheel 31 via a steering shaft and a rack & pinion mechanism. An electric power steering device 32 (hereinafter referred to as EPS) is provided in the middle of a steering force transmission path between the steering wheel 31 and the steerable wheels 30, which EPS applies an assist torque to the steering torque in accordance together with the travel state and the steering torque of the driver. The electric power steering device 32 may be a column assist type or a rack assist type and is not particularly limited.

The vehicle has an information acquiring device 35 comprising a radar and an imaging element and acquires information of the road surface state around the vehicle and of obstacles, etc., including other vehicles. This information acquiring device 35 detects, for example, obstacles around the vehicle (frontward vehicles, pedestrians, and the like).

A control unit CU comprises an automatic driving control unit 101 that controls an engagement state of the clutch 2, a shifting state of the belt-type continuously variable transmission 3, an operation state of the engine 1, an operation state of the starter motor 110 and the ALT, an operation state of the brake control unit 8, and an operation state of the electric power steering device 32, and that carries out automatic driving control (hereinafter referred to as AD) for automatically driving the vehicle based on information of the vehicle periphery acquired by the information acquiring device 35 and an emergency evacuation control unit 102 that carries out emergency evacuation control for stopping the vehicle when the ALT fails during automatic driving control.

Next the automatic driving control will be described. The automatic driving control unit 101 determines a target travel path based on travel path conditions, destination information set by the driver, and the like, and carries out a control to travel along the target travel path while avoiding obstacles, etc. by detecting the information around the vehicle using the information acquiring device 35. At this time, a driving force of the vehicle is controlled by automatically controlling the throttle valve 13 of the engine 1, a braking force of the vehicle is controlled by automatically controlling the VDC, and a travel direction of the vehicle is controlled by automatically controlling the EPS. The automatic driving control unit 101 thereby automatically drives the vehicle along the target travel path.

Next the emergency evacuation control will be described. The emergency evacuation control unit 102 detects a failure of the ALT, and, upon determining that the ALT has failed during automatic driving control, it carries out emergency evacuation control for safely stopping the vehicle. Specifically, the emergency evacuation control unit detects obstacles around the vehicle using the information acquiring device 35 and makes an evacuation plan. Then, the emergency evacuation control unit actuates the brake control unit 8 and carries out a brake control necessary for stopping the vehicle while avoiding a collision with the obstacles based on the evacuation plan, and actuates the EPS to carry out automatic steering control toward a position appropriate for stopping the vehicle while avoiding the obstacles.

Figure 2:
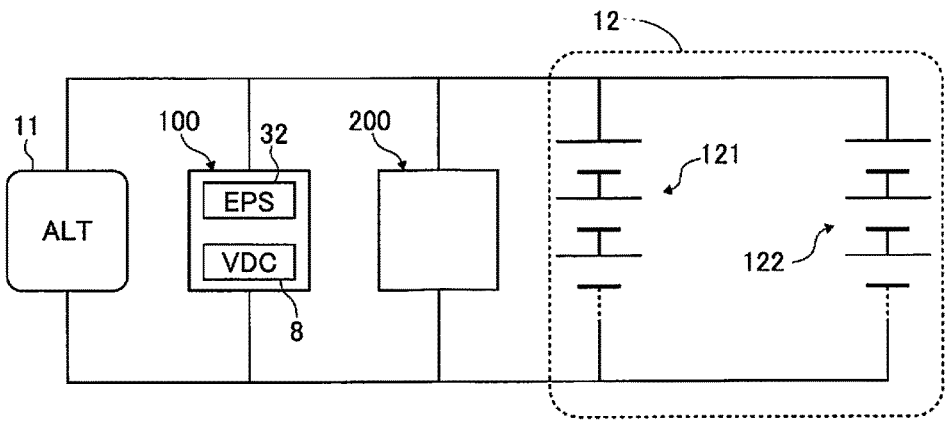
FIG. 2 is a schematic view showing art electrical system of a vehicle according to the first embodiment.

FIG. 2 is a schematic view showing an electrical system of the vehicle according to the first embodiment. The battery unit 12 includes a main battery 121, which is a lead storage battery having a rating of 12 V, and a sub battery 122, which is a lead storage battery having a rating of 12 V. The ALT, a piece of automatic driving electrical equipment 100, and other electrical equipment 200 are connected in parallel to the battery unit 12. The automatic driving electrical equipment 100 is provided with the information acquiring device 35, the EPS, and the VDC. Examples of other electrical equipment 200 include the starter motor 110, an audio system, a navigation system, an air conditioning system, headlights, a wiper motor, and the like. In a state in which the ALT is functioning normally, it is possible to supply electric power from the ALT and the battery unit 12 to the automatic driving electrical equipment 100 and the other electrical equipment 200. On the other hand, in a state in which the ALT has failed during automatic driving control, electric power cannot be supplied from the ALT, so emergency stop control is carried out. In emergency stop control, electric power is supplied from the battery unit 12 to the automatic driving electrical equipment 100, while the electric power to be supplied from the battery unit 12 to the other electrical equipment 200 is limited in accordance with the travel state.

That is, when the vehicle is configured to be capable of executing automatic driving control, it is conceivable to mount an auxiliary sub battery in addition to the normal lead storage battery in order to cope with an increase in the power consumption. At this time, by mounting a lead storage battery as the sub battery, it is possible to suppress the cost compared to a case of mounting a battery such as a lithium ion battery or a capacitor. However, although electric power can be ensured by the lead storage battery, the electric power that can be output per unit time is limited. Specifically, when a large current is supplied, the drop in voltage tends to be large. If the ALT fails at this time, it becomes difficult to ensure a sufficient electric power supply to the electrical equipment due to the large drop in voltage. Accordingly, if the ALT fails during AD, priority is given to the continuation of AD, and the electric power supply to the electrical equipment having low relevance with respect to the safety of the vehicle, such as the audio system and the air conditioning system, is suppressed.

Figure 3:
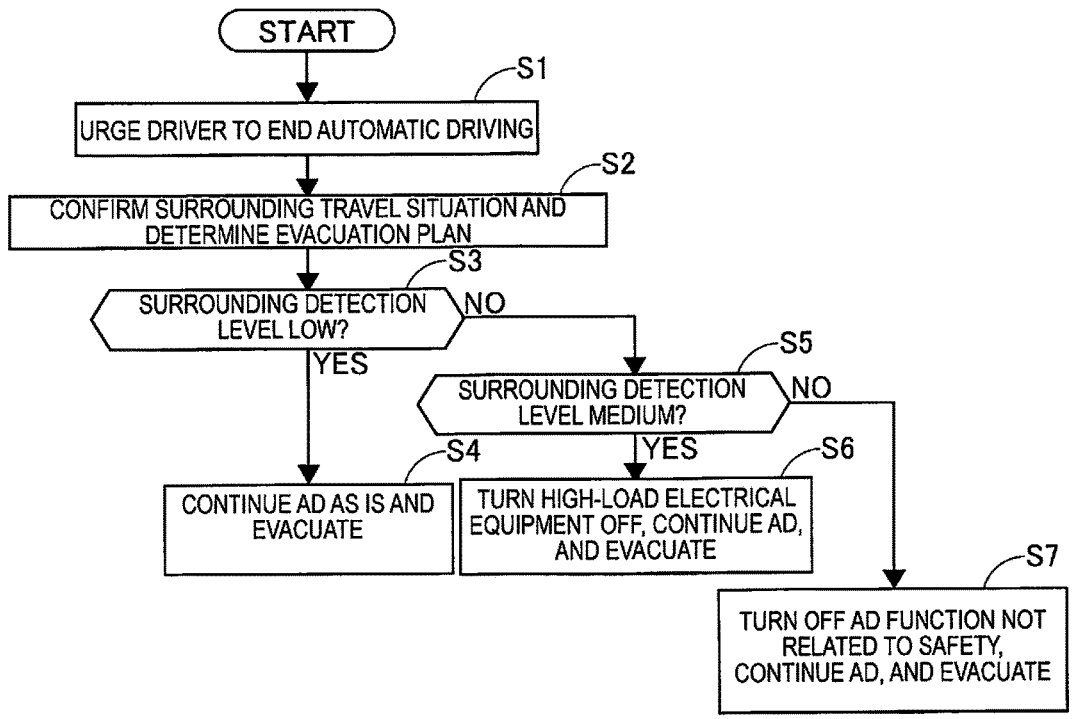
FIG. 3 is a flow chart showing an emergency evacuation control process according to the first embodiment.

FIG. 3 is a flow chart showing the emergency evacuation control process according to the first embodiment. This flow is a process that is carried out after detecting a failure of the ALT during AD.

In Step S1, the driver is urged to end AD. This is because the power consumption is suppressed when AD is ended.

In Step S2, the information acquiring device 35 confirms the surrounding travel situation and determines an evacuation plan for stopping the host vehicle in a safe location, such as a road shoulder. Then, a surrounding detection level corresponding to the situation of other vehicles, obstacles, etc. around the host vehicle is set to "low," "medium," or "high." This surrounding detection level is correlated with the power consumption of AD at the time of the evacuation, whereby the power consumption of AD increases as the surrounding detection level becomes higher. The surrounding detection level will be described in detail below.

In Step S3, it is determined whether or not the surrounding detection level is "low"; if "low," the process proceeds to Step S4, and otherwise the process proceeds to Step S5.

In Step S4, AD is continued as is, and evacuation is carried out based on the evacuation plan.

In Step S5, it is determined whether or not the surrounding detection level is "medium"; if "medium," the process proceeds to Step S6, and otherwise, it is determined that the surrounding detection level is "high" and the process proceeds to Step S7.

In Step S6, the high-load electrical equipment is turned OFF, AD is continued, and evacuation is carried out based on the evacuation plan.

Here, among the other electrical equipment 200, examples of high-load electrical equipment include the air conditioning system and the audio system.

In Step S7, the electrical equipment, other than the automatic driving electrical equipment 100 and the electrical equipment related to safety from among the other electrical equipment 200, is turned OFF, AD is continued, and evacuation is carried out based on the evacuation plan. Here, examples of electrical equipment related to safety include the headlights, the wiper motor, and the hazard lamp.

Figure 4:
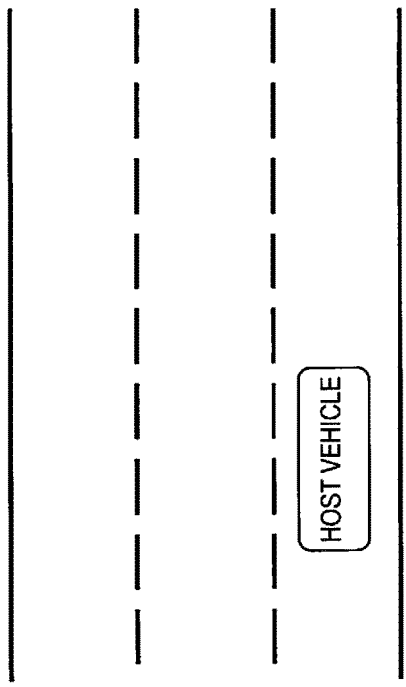
FIG. 4 is a schematic view showing a travel situation around a host vehicle according to the first embodiment.

FIGS. 4 to 7 are schematic views showing the travel situation around the host vehicle. Where there is only the host vehicle on the travel path and surrounding vehicles are not detected, as illustrated in FIG. 4, sudden braking and sudden steering are not required, and few procedures are necessary for guidance. In this case, the estimated power consumption of AD is low.

Figure 5:
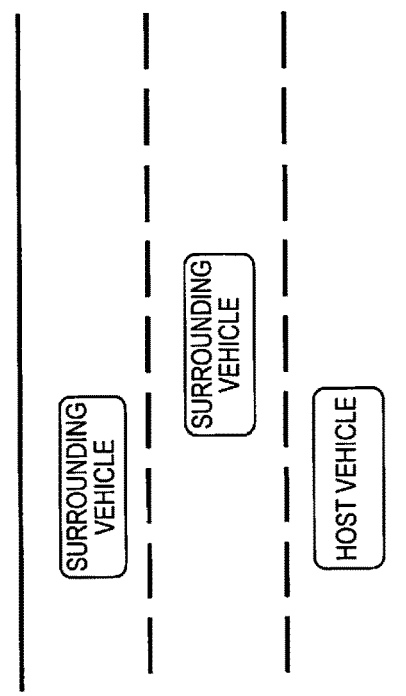
FIG. 5 is a schematic view showing the travel situation around the host vehicle according to the first embodiment.
Figure 6:
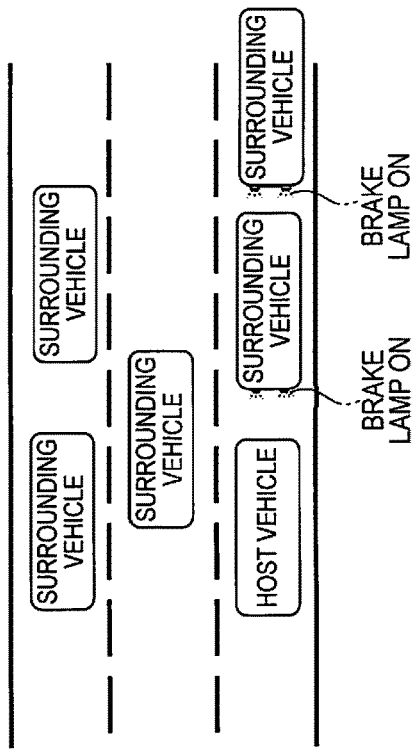
FIG. 6 is a schematic view showing the travel situation around the host vehicle according to the first embodiment.
Figure 7:
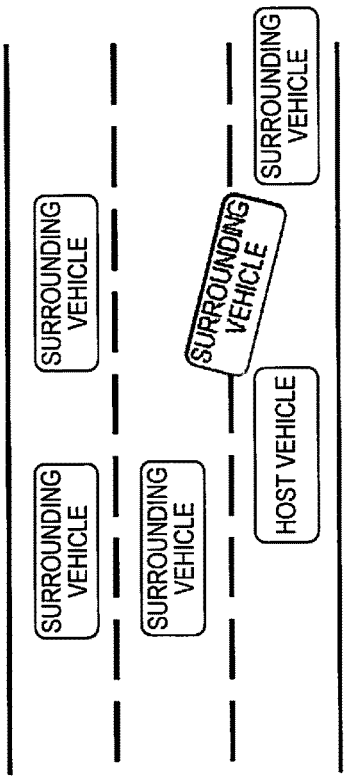
FIG. 7 is a schematic view showing the travel situation around the host vehicle according to the first embodiment.

When other vehicles or obstacles are detected in the periphery, and the host vehicle is to be evacuated onto the road shoulder, if acceleration/deceleration or a lane change is required, as illustrated in FIG. 5, the estimated power consumption of AD is moderate. When other vehicles or obstacles are detected in the periphery, and the host vehicle is to be evacuated onto the road shoulder when brake light illumination of a vehicle in front of the host vehicle is detected, as illustrated in FIG. 6, it becomes necessary for the host vehicle to carry out sudden braking in accompaniment with emergency avoidance, and the estimated power consumption of AD is high. Similarly, when other vehicles or obstacles are detected in the periphery, and a surrounding vehicle cuts in front of the host vehicle, as illustrated in FIG. 7, it becomes necessary for the host vehicle to carry out sudden braking or sudden steering in accompaniment with emergency avoidance, and the estimated power consumption of AD is high.

As described above, the surrounding detection level is comprehensively set to "low," "medium," or "high" based on the power consumption of AD estimated based on the travel situation around the host vehicle, as illustrated in FIGS. 4 to 7. Then, it is possible to stably execute the evacuation by AD by suppression of the electric power to be supplied to the other electrical equipment 200 in accordance with the surrounding detection level.

As described above, the effects listed below can be obtained by use of the first embodiment. (1) Automatic driving electrical equipment 100 that automatically drives a vehicle; other electrical equipment 200; a battery unit 12 (battery) configured to supply electric power to the automatic driving electrical equipment 100 and the other electrical equipment 200; and an alternator 11 configured to supply electric power to the automatic driving electrical equipment 100, the other electrical equipment 200, and the battery unit 12 are provided, and a step for suppression of the amount of electric power supplied from a battery unit 12 to the other electrical equipment 200 in the event the ALT fails during automatic driving by use of the automatic driving electrical equipment 100 is provided. Here, "suppression" means to make the electric power supply amount smaller than the electric power supply amount required by the other electrical equipment 200.

Accordingly, it is possible to ensure the electric power to be used by the AD and to improve the safety.

(2) Surrounding information of the vehicle is detected, the electric power to be consumed by the automatic driving electrical equipment 100 until the vehicle stops is estimated based on the detected surrounding information, and the electric power supply to the other electrical equipment 200 is reduced as the estimated amount of electric power increases.

Accordingly, when the power consumption of the AD is small, it is possible to ensure the electric power supply to the other electrical equipment 200 and to ensure the comfort of the passenger.

(3) The battery unit 12 is a lead storage battery for vehicles. The lead storage battery is currently the most widely used battery and thus is highly versatile and is able to reduce cost. However, although the drop in voltage of lead storage batteries accompanying power consumption is large, it is possible to ensure the stability of the electric power supply to AD by suppression of the power consumption amount in advance.

Second Embodiment

Figure 8:
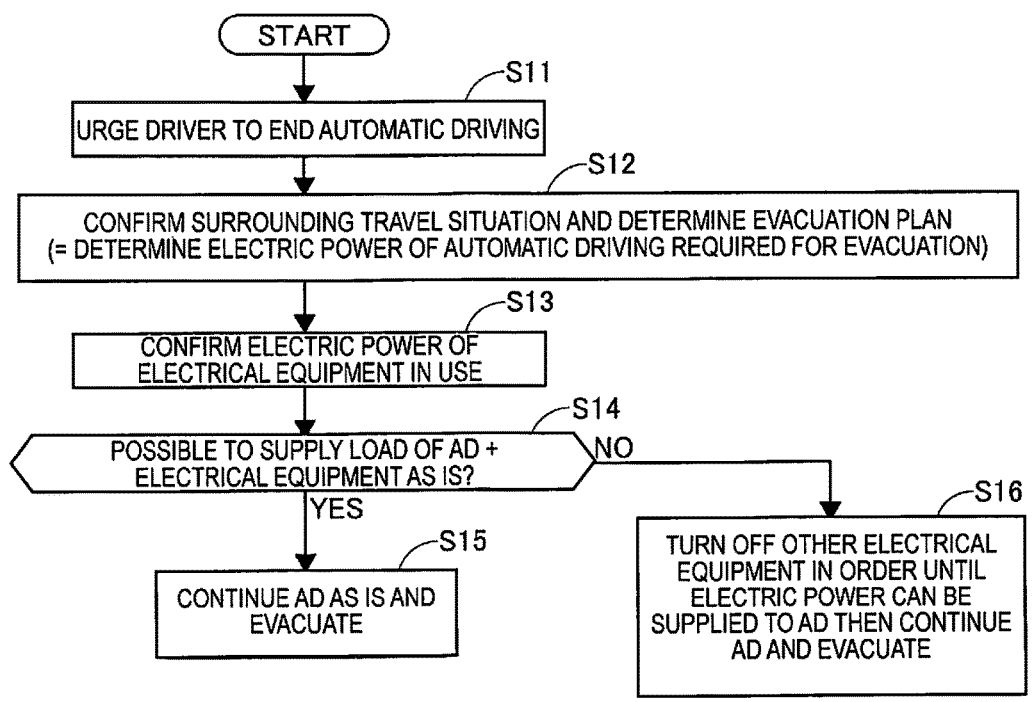
FIG. 8 is a flow chart showing the emergency evacuation control process according to a second embodiment.

Next the second embodiment will be described. Because the basic configuration is the same as the first embodiment, only the deviating points will be described. In the first embodiment, the power consumption amount is estimated based on the situation around the vehicle. In contrast, the second embodiment is different in the point that the power consumption amount is estimated based on the evacuation plan. FIG. 8 is a flow chart showing the emergency evacuation control process according to the second embodiment. This flow is a process that is carried out after detecting a failure of the ALT during AD.

In Step S11, the driver is urged to end AD. This is because the power consumption is suppressed when AD is ended.

In Step S12, the information acquiring device 35 confirms the surrounding travel situation and determines an evacuation plan for stopping the host vehicle in a safe location, such as the road shoulder. At this time, the electric power required by AD for evacuation is determined by estimation and calculation.

In Step S13, the electric power that is consumed by the electrical equipment currently being used is confirmed.

In Step S14, it is determined whether or not the electric power to be consumed by both AD and the electrical equipment currently being used can be supplied even if the current use state continues; if it is determined that supply is possible, the process proceeds to Step S15, and if it is determined that supply is not possible, the process proceeds to Step S16.

In Step S15, AD is continued as is and evacuation is carried out based on the evacuation plan.

In Step S16, AD is continued, the other electrical equipment 200 is sequentially turned OFF until it becomes possible to supply electric power to AD, and evacuation is carried out based on the evacuation plan. An example of the specific order in which to turn OFF the other electrical equipment 200 is the audio system, the air conditioning system, the hazard lamp, the head lamp, and the wiper motor.

Figure 9:
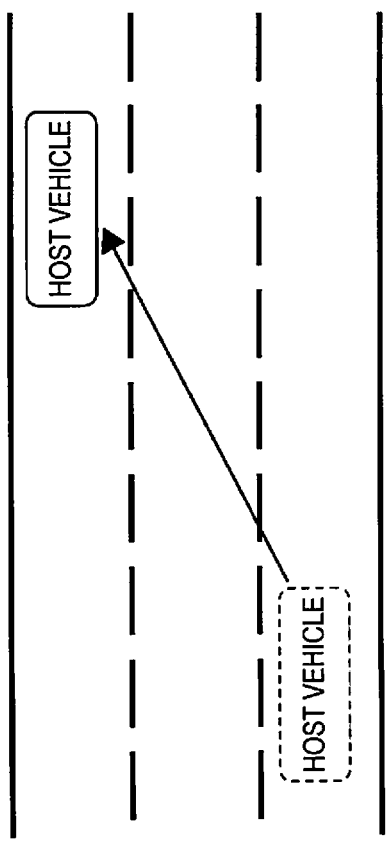
FIG. 9 is a schematic view showing an evacuation plan based on the travel situation around the host vehicle according to the second embodiment.

FIGS. 9 to 13 are schematic views showing the evacuation plan based on the travel situation around the host vehicle. In the drawing, the fat arrow extending from the host vehicle is the evacuation route. Where there is only the host vehicle on the travel path, as illustrated in FIG. 9, it is possible to take an evacuation route that guides the vehicle onto the road shoulder, or the like, while steering and decelerating gently. In this case, the estimated power consumption of AD is low.

Figure 10:
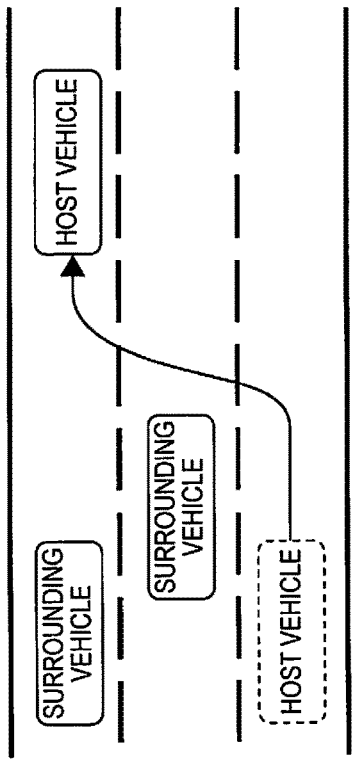
FIG. 10 is a schematic view showing the evacuation plan based on the travel situation around the host vehicle according to the second embodiment.
Figure 11:
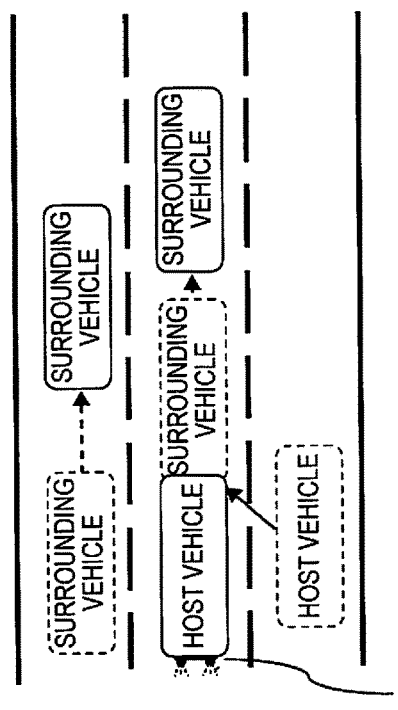
FIG. 11 is a schematic view showing the evacuation plan based on the travel situation around the host vehicle according to the second embodiment.

When surrounding vehicles that are running in parallel are present on the travel path, as illustrated in FIG. 10, the vehicle is accelerated in order to overtake the surrounding vehicles and carries out a lane change thereafter; therefore, an evacuation route in which acceleration, a relatively large amount of steering, and deceleration are carried out when guiding onto the road shoulder, or the like, is employed. In addition, in the event a surrounding vehicle is present diagonally in front of the host vehicle, as illustrated in FIG. 11, an evacuation route, in which the vehicle is decelerated to allow the surrounding vehicle to move ahead and carries out a lane change, is employed. In this case, the estimated power consumption of AD is moderate.

As illustrated in FIG. 12, a vehicle present in front of the host vehicle is thought to be decelerating from the fact that the brake lamps are on. In addition, surrounding vehicles present diagonally in front of the host vehicle are thought to be decelerating from the fact that the brake lamps are on. In this case, an evacuation route, in which the vehicle is decelerated more rapidly than in the case of FIG. 11 to allow the surrounding vehicle to move ahead and carries out a lane change, is employed. In addition, as illustrated in FIG. 13, a vehicle present in front of the host vehicle is thought to be decelerating from the fact that the brake lamps are on. If a further surrounding vehicle is present running in parallel with the host vehicle, then it is not possible to carry out an operation to avoid the vehicle in front by means of a lane change. In this case, it is necessary to decelerate even more rapidly than in the case of FIG. 12. In these cases, the estimated power consumption of AD is high.

As described above, it is possible to ensure the stability of the electric power supply to AD by turning OFF the electric power supply to the other electric equipment 200 in the order of the electric equipment having low priority for supplying electric power thereto during evacuation, based on the power consumption of AD, estimated based on the evacuation route of the host vehicle illustrated in FIGS. 9 to 13. Accordingly, the same actions and effects as in the first embodiment can be obtained.

OTHER EMBODIMENTS

The present invention was described above based on embodiments, but the specific configuration may be otherwise. In the embodiments, the EPS provided by the invention may be applied to a vehicle equipped with a steer-by-wire system. Additionally, in the embodiments, a vehicle having an ALT was described as an example, but the invention may be applied to a vehicle equipped with a starter generator that functions as an electric motor and as a generator. Additionally, in the embodiments, as example was shown in which an engine is provided as the only power source, but the invention can be applied to a hybrid vehicle that has a motor as a power source.

Moreover, in the embodiments, the main battery 121 and the sub battery 122 are both configured as lead storage batteries, but the main battery 121 may be a lead storage battery, and the sub battery may be a battery other than a lead storage battery, such as a lithium ion battery or a next-generation battery such as a zinc air battery.

The invention claimed is:

1. A vehicle control method for controlling a vehicle having
   automatic driving electrical equipment that automatically drives a vehicle;
   other electrical equipment;
   a battery configured to supply electric power to the automatic driving electrical equipment and the other electrical equipment; and
   an alternator configured to supply electric power to the automatic driving electrical equipment, the other electrical equipment and the battery;
   the vehicle control method comprising:
   detecting surrounding information of the vehicle in an event the alternator fails during automatic driving by use of the automatic driving electrical equipment,
   estimating electric power to be consumed by the automatic driving electrical equipment until the vehicle stops based on a plan for stopping the vehicle in a safe location in accordance with the surrounding information that was detected, and
   reducing the electric power supplied from the battery to the other electrical equipment apart from the automatic driving electrical equipment as the estimated amount of electric power increases.

2. The vehicle control method according to claim 1, wherein
   the battery is a lead storage battery for vehicles.

3. A vehicle control device comprising:
   automatic driving electrical equipment that automatically drives a vehicle;
   other electrical equipment;
   a battery configured to supply electric power to the automatic driving electrical equipment and the other electrical equipment;
   an alternator configured to supply electric power to the automatic driving electrical equipment, the other electrical equipment and the battery; and
   a controller configured to control an amount of electric power supplied from the battery to the automatic driving electrical equipment and the other electrical equipment;
   the controller being further configured to detect surrounding information of the vehicle in an event the alternator fails during automatic driving by use of the automatic driving electrical equipment,
   the controller being further configured to estimate electric power consumed by the automatic driving electrical equipment until the vehicle stops based on a plan for stopping the vehicle in a safe location in accordance with the detected surrounding information, and reduces the electric power supplied from the battery to the other electrical equipment apart from the automatic driving electrical equipment as the estimated amount of electric power increases.

4. A vehicle control method for controlling a vehicle comprising:
   automatic driving electrical equipment that includes an electric steering device and that automatically drives a vehicle;
   other electrical equipment apart from the automatic driving electrical equipment;
   a battery configured to supply electric power to the automatic driving electrical equipment and the other electrical equipment; and
   an alternator configured to supply electric power to the automatic driving electrical equipment, the other electrical equipment and the battery;
   the vehicle control method comprising:
   detecting surrounding information of the vehicle in an event the alternator fails during automatic driving by use of the automatic driving electrical equipment,
   estimating electric power consumed by the automatic driving electrical equipment until the vehicle has been guided toward a position appropriate for stopping the vehicle based on a plan for safely stopping the vehicle in accordance with the surrounding information that was detected, and
   reducing the electric power supplied from the battery to the other electrical equipment apart from the automatic driving electrical equipment as an estimated amount of the electric power increases.

\* \* \* \* \*